July 14, 1942. T. J. TUREK 2,289,559
BRAKE MECHANISM
Filed Jan. 18, 1940
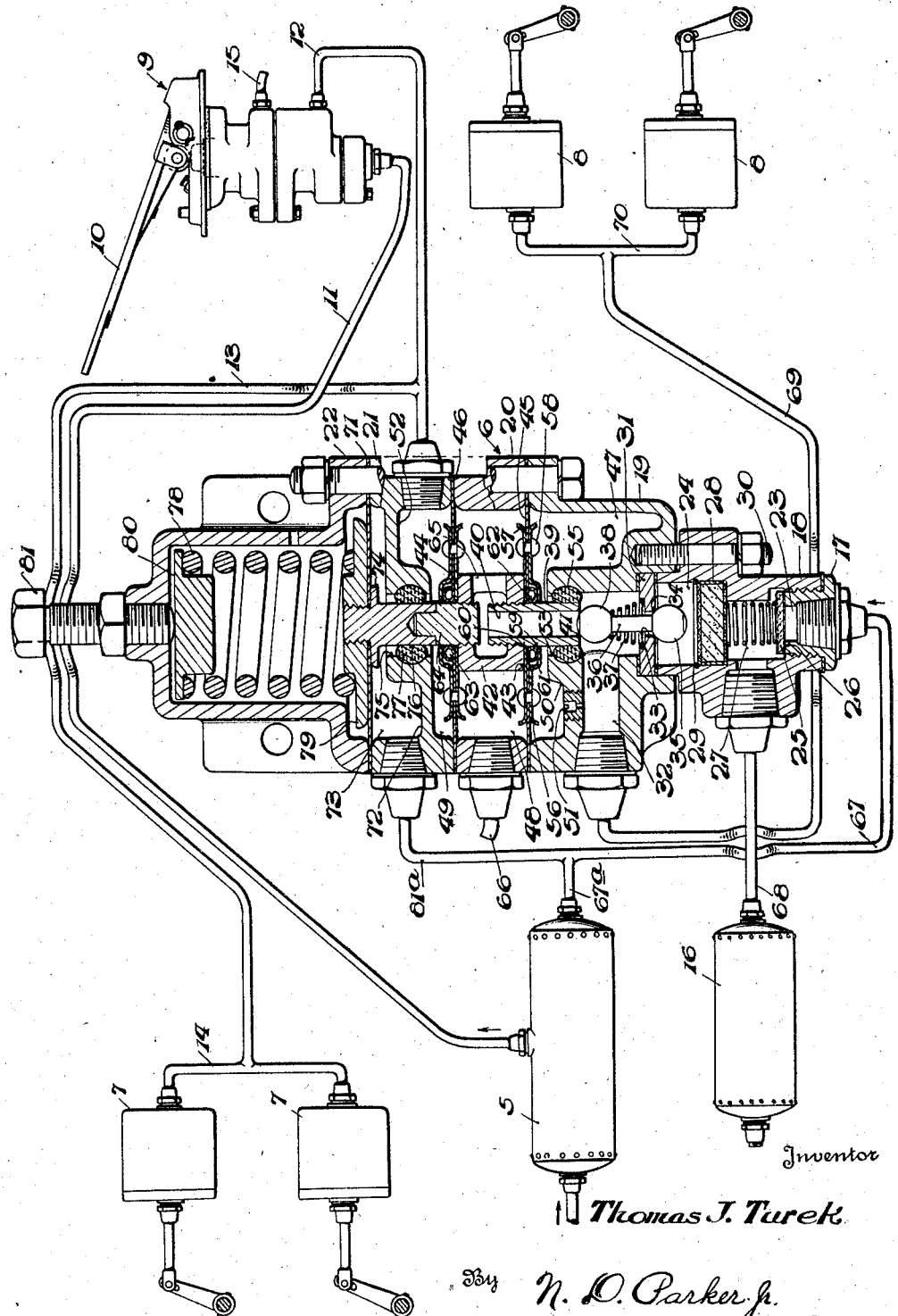
Inventor
Thomas J. Turek
By N. O. Parker Jr.
Attorney Patented July 14, 1942

2,289,559

UNITED STATES PATENT OFFICE 2,289,559

BRAKE MECHANISM

Thomas J. Turek, Pittsburgh, Pa., assignor to Bendix-Westinghouse Automotive Air Brake Company, Pittsburgh, Pa., a corporation of Delaware Application January 18, 1940, Serial No. 314,533

16 Claims. (Cl. 303—63)

This invention relates to brakes, and more particularly to fluid pressure brake systems for automotive vehicles.

The principal object of the present invention is to provide for automatic actuation of the vehicle brakes in the event of failure of the service brake applying means controlled by the operator.

Various means for effecting such brake applications have been used in the past, and have in general comprised systems having a main reservoir and an auxiliary reservoir adapted to receive pressure from the main reservoir, together with relay valve means of the fluid pressure actuated type controlled by fluid pressure from the main reservoir through the medium of an operator controlled brake valve of the self-lapping type, together with valve mechanism for supplying fluid pressure from the auxiliary reservoir to the brake actuators automatically on failure of the pressure in the main reservoir. The operation of automatic emergency valves of the above described type, however, has not always been of a positive nature and has not been directly dependent and proportional to the degree of pressure drop in the main reservoir, with the result that, in some cases, sudden and unnecessary brake applications have occurred, while, in other cases, the automatic valve mechanism has failed to act properly on failure of the main reservoir supply. It is accordingly another object of the present invention to provide, in connection with a brake system of the above type, automatic means controlled by the pressure in the main reservoir for positively effecting an emergency brake application coincident with a predetermined drop in pressure in the main reservoir.

A further object of the present invention is to provide automatic emergency control valve means for automatically effecting an emergency brake application whereby the pressure developed in the brake actuators is directly proportional to the degree of pressure drop in the main reservoir.

Yet another object of the invention is to provide automatic emergency brake controlling valve means so constituted as to maintain pressure in the brake actuators during initial build-up of fluid pressure in the reservoirs until a predetermined pressure is reached in the main reservoir.

A still further object of the invention is to provide, in a fluid pressure brake system of the above type, fluid pressure operated relay valve means for controlling the service application of the brake, together with independent means for actuating the relay valve automatically on a reduction of pressure in the main reservoir.

Another object of the invention is to provide an automatic emergency valve for controlling the brakes controlled in accordance with the pressure in the main reservoir and having adjustable means for rendering the emergency action of the valve ineffective until the pressure in the main reservoir becomes less than a predetermined value.

Yet another object of the invention is to provide, in a system of the above character, novel and efficient fluid pressure operated control valve means, wherein the fluid pressure responsive means for operating the valve mechanism is so constituted as to be cheaply and efficiently assembled in such a manner as to avoid any leakage of fluid from the system which would be detrimental to the operation thereof.

The above and other objects of the invention will appear more fully hereinafter from the following detailed description when taken in connection with the accompanying drawing, wherein one form of the present invention is illustrated. It is to be expressly understood, however, that the drawing is utilized for the purpose of illustration only and is not designed as a definition of the limits of the invention, reference being had for this purpose to the appended claims.

In the drawing, the single figure illustrates diagrammatically a fluid pressure brake system of the type to be described in more detail hereinafter, a portion of the valve mechanism being shown in section, and other parts being illustrated diagrammatically.

The fluid pressure brake system as disclosed in the drawing comprises a main reservoir 5 adapted to be supplied with fluid under pressure from a suitable compressor or other source, not shown, a relay emergency valve mechanism 6, front and rear fluid pressure operated brake actuators 7 and 8 respectively, and an operator controlled brake valve 9, preferably of the so-called self-lapping type, which may be constructed in accordance with the disclosure in the patent to William J. Andres et al., No. 2,133,275, dated October 18, 1938. As will be readily understood from the above patent, the brake valve 9 includes intake and exhaust valves, together with means included in the valve mechanism for sequentially operating said valves on movement of a brake valve pedal 10 associated therewith in such a manner as to connect a conduit 11, leading from the main reservoir 5 to the brake valve, to a conduit 12 adapted to conduct fluid pressure from the brake valve to the brake actuator 7 through conduits 13 and 14 on downward movement of the brake pedal 10, and adapted on reverse movement of the brake pedal to connect conduit 12 with an exhaust conduit 15 on the brake valve, thus allowing the fluid pressure in brake actuator 7 to exhaust to atmosphere through conduits 14, 13, 12, brake valve 9 and exhaust conduit 15. In addition to the main reservoir 5, an auxiliary reservoir 16 is also provided, and is adapted to receive fluid pressure from the main reservoir and to supply fluid pressure to the rear brake actuators 8 in a manner to be more fully described hereinafter.

As shown in detail on the drawing, the control valve mechanism 6 includes a plurality of casing members 17, 18, 19, 20, 21 and 22, which when assembled in the manner shown serve to define various chambers and to carry and enclose the various operating parts of the valve mechanism. The casing member 17 is threadedly received by the member 18 to form an inlet chamber 23 and an inlet valve chamber 24, normally separated by a check valve 25 urged against a valve seat 26 formed on the upper end of the member 17 as by means of a spring 27 interposed between the upper surface of the valve 25 and an air strainer 28 suitably retained in the intake valve chamber 24 by means of a wire ring 29. The casing member 18 is attached to the casing 19 by means of bolt 30, a ported partition 31 being interposed between the two members to separate the chamber 24 from an outlet chamber 32 formed in the member 19. The lower end of port 33 formed in partition 31 is provided with an intake valve seat 34 and is adapted to be normally closed by a spherical intake valve 35 on a stem 36, as by means of a valve spring 37 interposed between the upper surface of the partition and the lower portion of a spherically shaped exhaust valve 38 carried by the upper end of the valve stem 36.

In order that the intake and exhaust valves 35 and 38 may be controlled by fluid pressure operation, a valve operating element 39 mounted for vertical movement in the casing is provided, having a bore 40 extending through the center of the element and a valve seat 41 formed at the lower end of the bore and adapted on initial downward movement to engage the spherical valve 38 and on further downward movement to move the inake valve 35 to open position to permit the flow of fluid pressure from intake valve chamber 24 to outlet chamber 32. As illustrated in the drawing, a member 42, threadedly received by the valve operating element 39, is provided with lower and upper surfaces 43 and 44 adapted to abut respectively the upper and lower surfaces of diaphragms 45 and 46, which diaphragms are clamped between casing members 19 and 20, and 20 and 21 respectively, in such manner as to form, in connecion with the various casing members, a diaphragm chamber 47 in casing 19, an exhaust chamber 48 in casing 20 and a control chamber 49 in the casing 21. The lower portion of chamber 47 is formed by a partition 50 having a restriced passage 51 therethrough connecting chambers 47 and 32. The upper portion of the control chamber 49 is defined by a partition 52 formed in the casing member 21. In order that the restricted passage 51 may constitute the sole connection for the flow of fluid pressure between the outlet chamber 32 and the diaphragm chamber 47, the central portion of the partition 50 is formed with a bore 53 which is adapted to receive an annular sealing ring 55 formed of a soft rubber-like substance and compressed between the surface of the groove and the outer surface of the valve operating element 39. The control chamber 49 is connected to the brake valve 9 by means of the conduit 12, and it will thus be seen that the diaphragm 46, when subjected to fluid pressure in chamber 49, provides means for operating the valve operating element 39 by virtue of its abutment with the upper surface 44 of the member 42 which is carried by the valve operating element.

In previous valve mechanisms of the type heretofore described, it has been customary to clamp the diaphragm members to the valve operating element by means of nuts threaded to the element, or similar devices, with a resultant increased expense as well as a tendency to distort the diaphragm. Novel means are provided by the present invention for eliminating these difficulties. With particular reference to the diaphragm 45 shown on the drawing, it will be noted that oppositely disposed plates of pressed steel or other suitable material 56 and 57 respectively are clamped to the diaphragm by means of rivets 58 and are provided at their center with bores 59 and 60 adapted to fit loosely over the outer surface of the valve operating element 39. In order that no leakage may occur from chamber 47 to chamber 48 through the passage formed between the inner surface of the bores and the outer surface of the valve operating element, the lower plate 56 is provided with a cup-shaped depression 61 near its central portion and a soft rubber-like annular ring 62 is carried in the depression and clamped between the inner surfaces of the two plates in such a way as to be compressed in the cup-shaped depression and bear against the outer surface of the valve operating element 39, thus providing simple and efficient means for preventing leakage at this point, and at the same time preventing undue distortion of the diaphragm and allowing the diaphragm to actuate the valve operating element in an upward direction by virtue of the engagement of the upper plate 57 with the lower surface 43 of the member 42. It will be noted that the upper diaphragm 46 is arranged in a similar manner, the annular sealing ring 63 being arranged in sealing engagement with a member 64 threadedly received by the member 42 and the diaphragm assembly being arranged to engage the upper surface 44 of the member 42 to impart downward movement to the valve actuating element 39 under the action of fluid pressure in the control chamber 49. The exhaust chamber 48 is connected to the outlet chamber 32 by means of a port 65, formed in the member 42, and bore 40 of the valve actuating element 39, while an exhaust conduit 66 serves to connect the exhaust chamber 48 with atmosphere. The control chamber 49 is adapted to receive fluid under pressure from the brake valve 9 through the conduit 12, and it will thus be apparent that a relay valve mechanism has been provided in accordance with the foregoing description having an intake valve 35 adapted to be actuated by downward movement of the diaphragm 46 acting to move valve actuating element 39 in response to fluid pressure received in chamber 49 from the brake valve, while diaphragm 45 is adapted in response to the action of fluid pressure in chamber 47 to move the valve actuating element upwardly to permit the spring 37 to close the intake valve 35, and thereafter to force the element away from the exhaust valve 38 and permit fluid pressure to be exhausted from the chamber 32 to atmosphere through the bore 40 the port 65 in member 42, the exhaust chamber 48 and exhaust conduit 66.

In order that the relay valve described hereinbefore may be effective to control the flow of fluid pressure to and from the rear brake actuators 8, the inlet chamber 23 is connected with the main reservoir 5 through conduits 67 and 67a, the inlet valve chamber 24 being connected with the auxiliary reservoir 16 through a conduit 68 and the outlet chamber 32 being connected with the fluid pressure brake actuators 8 through conduits 69 and 70.

When the system is put into operation, the main reservoir 5 is charged with fluid under pressure from a suitable source such as the vehicle compressor, not shown, and, as soon as this pressure is sufficient to overcome the check valve spring 27, fluid under pressure will flow from reservoir 5 to auxiliary reservoir 16 through conduit 67a, conduit 67, inlet chamber 23 and by check valve 25 into inlet valve chamber 24, and thence through conduit 68, it being obvious that the check valve 25 which is normally held in closed position by spring 27 will act to prevent the flow of fluid pressure from reservoir 16 to reservoir 5 in the event the pressure in reservoir 5 drops below that of reservoir 16. In the event the operator wishes to effect a service brake application, the brake pedal 10 is depressed, thus causing fluid to flow from main reservoir 5 to the brake actuators 7 through conduits 12, 13 and 14, while the fluid under pressure flowing from the brake valve to the control chamber 49 through the conduit 12 will move the upper diaphragm 46 as well as the valve actuating element 39 downwardly to close the exhaust valve 38, further movement of the valve actuating element acting to open the intake valve 35 and establish a connection between the auxiliary reservoir and the rear brake actuators 8 through conduit 68, chamber 24, port 33, outlet chamber 32 and conduits 69 and 70, thus effecting a brake application under the control of brake pedal 10. If the self-lapping brake valve is set by the operator to deliver a predetermined pressure to the control chamber 49, it will be readily apparent to those skilled in the art that, as the pressure builds up in the brake actuators 8 and in the outlet chamber 32 of the relay valve, fluid under pressure will be conducted from chamber 32 to chamber 47 through the restricted passage 51 and act with an upward force on the diaphragm 45 to balance the downward force exerted by the pressure acting on the diaphragm 46 and move the valve operating element 39 upwardly to close the intake valve and maintain the valve mechanism in lapped position in the well known manner. In like manner, operation of the brake pedal 10 to exhaust fluid pressure from the control chamber 49 through conduit 12, brake valve 9 and exhaust conduit 15 will cause the fluid pressure force acting on the diaphragm 45 to overbalance the force acting downwardly on the diaphragm 46, thus imparting upward movement to the valve actuating element 39, opening the exhaust valve and allowing fluid from the actuators 8 to escape to atmosphere through conduits 70 and 69, outlet chamber 32, bore 40 of the element 39, port 65, exhaust chamber 48 and exhaust conduit 66, which action will continue until the forces acting on the diaphragms 45 and 46 respectively balance again, at which time the valve will again assume the lapped position and the pressure in the actuators 8 will be held at a definite value determined by the setting of the brake valve 9. In the operation of the system described, the brake valve 9 will operate to directly control the pressure in the actuators 7 and indirectly through the operation of the relay valve to control the pressure in the actuators 8, and this system will be effective as long as an adequate supply of fluid under pressure is maintained in the main and auxiliary reservoirs. It will be clear, however, that depletion of the pressure in the main reservoir beyond a certain point will render the brake valve 9 ineffective to supply fluid under pressure to the control chamber 49 of the relay valve, and will prevent the operator from making a full application of either the rear or the front brakes to retard the speed of the vehicle.

As it is desirable to safeguard fluid pressure brake systems of the present type against depletion of the main reservoir pressure, additional mechanism is provided by the present invention for effecting an automatic application of the rear brakes through the action of the relay valve whenever this condition arises, as well as means for automatically maintaining a connection between the auxiliary reservoir and the rear brake actuators 8 during the initial build-up of pressure in the main and auxiliary reservoirs and until this pressure has reached a value in both reservoirs sufficient to permit adequate and efficient actuation of the brakes in response to the controlling action of the brake valve. To accomplish this desirable end, a third diaphragm 71 is clamped between the casing members 21 and 22, thus cooperating with a partition 72 formed on the member 21 to provide a second control chamber 73 below the diaphragm. A second valve actuating element 74 is attached to the center of the diaphragm in any suitable manner and extends from chamber 73 into chamber 49 through a bore 75 formed in partition 72, with its lower end in abutting relationship with the upper end of the member 64, which, as heretofore described, is operatively connected with the valve actuating element 39 by means of the member 42. An annular sealing ring 77 is compressed between the bore 75 and the outer surface 76 of the member 74 in such a manner as to permit vertical movement of the member 74 and to prevent leakage of fluid pressure between the chambers 49 and 73, as heretofore described in connection with the sealing ring 55 mounted between outlet chamber 32 and diaphragm chamber 36. The upper casing member 22 serves to house a spring 78 which is interposed between a pressure plate 79 carried by the member 74 and an upper spring seat 80 which abuts an adjustable screw 81 threadedly received by the upper portion of the casing member 22. The tension of this spring is normally adjusted so as to force the element 74 downwardly with a consequent downward movement of the valve actuating element 39, which in turn opens the intake valve 35 and serves to connect the auxiliary reservoir 16 with the rear brake actuators 8, thus effecting an emergency brake application. It will thus be apparent that the spring 78 will normally serve to maintain the intake valve 35 of the relay valve in open position, regardless of the action of the brake valve 9 in supplying fluid pressure to the control chamber 49 of the relay valve, and, in order that the brake application effected by the action of the spring 78 may be released to permit control of the brakes in the usual manner through the functioning of the brake valve 9 and the fluid pressure operated relay valve mechanism, the second control chamber 73 below the diaphragm 71 is connected with the main reservoir 5 through the conduits 81a and 67a, whereby the pressure in the main reservoir is free to act upwardly on the diaphragm 71 at all times, causing the diaphragm to exert an upward force opposing and overcoming the downward force exerted by the spring 78 when the pressure in the main reservoir exceeds a predetermined value, the result being that, when the predetermined pressure is reached in the main reservoir, the resulting upward movement of the diaphragm 71 and its attached valve actuating member 74 will be sufficient to permit the pressure in the diaphragm chamber 47 to move the valve actuating element 39 upwardly, closing the intake valve 35 and permitting the fluid pressure in the brake actuators 8 to exhaust to atmosphere through the relay valve in the manner already described. It will be evident from the foregoing description that the spring 78 tends to operate the mechanism of the relay valve to effect an automatic emergency application, while the pressure in the main reservoir 5 acting on the diaphragm 71 tends to prevent such an application, and that the tension of the spring may be so adjusted by the adjusting screw 81 as to render the automatic emergency brake applying means effective at any predetermined main reservoir pressure.

There has thus been provided by the mechanism herein described fluid pressure operated and controlled relay valve mechanism under the control of the operator for effecting and controlling the application and release of the brakes by the operation of the brake actuators 8, together with independently controlled means for automatically operating the relay valve mechanism and controlling the application and release of the rear brakes through the action of the actuators 8 under the control of the pressure in the main reservoir, so constituted that the automatic means is ineffective to apply the brakes when the pressure in the main reservoir is sufficient to allow safe and adequate brake operation through the ordinary control means and is operable automatically to apply the rear brakes when the main reservoir pressure drops to a value below that which is adequate for safe brake operation and before a similar drop in pressure can occur in the auxiliary reservoir, which is prevented from being subjected to a corresponding pressure drop by the check valve 25 interposed between the inlet chamber 23 and the inlet valve chamber 24, which chamber is connected to the auxiliary reservoir through conduit 18. It is also pointed out that, when the automatic brake controlling means is in operation due to a drop in the main reservoir pressure, no sudden and unexpected brake application can occur, due to the fact that the downward force exerted by the spring 78 is at all times opposed by the main reservoir pressure acting upwardly on the diaphragm 71 and by the pressure in diaphragm chamber 47 acting upwardly on the diaphragm 45. This is an important feature of the present invention from the standpoint of the vehicle operator, particularly in view of the fact that a slight loss of main reservoir pressure will cause only a slight application of pressure to the actuators 8, causing the brakes to drag sufficiently to advise the operator of the loss in main reservoir pressure without causing a brake application severe enough to cause locking of the rear wheels of the vehicle and possible skidding of the vehicle which might cause a serious accident. It is obvious that the front brake actuators 7 need not necessarily be operated and controlled directly by the brake valve 9 but may be controlled, if desired, by the action of the pressure operated relay valve and the automatic emergency brake control system, while additional vehicle brakes or brakes of a following vehicle may be controlled in a similar manner by the same or additional relay emergency valves without departing in any way from the spirit of the invention.

While the invention has been illustrated and described herein with considerable particularity, it is to be clearly understood that the same is not limited to the forms shown but may receive a variety of mechanical expressions, as will now readily appear to those skilled in the art. Reference will, therefore, be had to the appended claims for a definition of the limits of the invention.

What is claimed is:

1. In a fluid pressure brake system having a fluid pressure actuator for the brake, a main fluid pressure reservoir and an auxiliary fluid pressure reservoir, means including a fluid pressure operated valve mechanism for controlling the flow of fluid pressure from the auxiliary reservoir to the brake actuator, means including an operator controlled valve for controlling the flow of fluid pressure from the main reservoir to said valve mechanism for controlling the operation of the latter, means for conducting fluid pressure from the main reservoir to the auxiliary reservoir including a check valve for preventing the flow of fluid pressure through said means in one direction, resilient means separate from said check valve for actuating said valve mechanism independently of the controlling action of said operator controlled valve, and means actuated by main reservoir pressure for preventing the operation of said last named actuating means when the pressure in said reservoir exceeds a predetermined value.

2. In a fluid pressure brake system having fluid pressure actuators for the brakes, a main fluid pressure reservoir and an auxiliary fluid pressure reservoir, means for conducting fluid pressure from the main reservoir to the auxiliary reservoir including a device for preventing the flow of fluid pressure from the auxiliary reservoir to the main reservoir, valvular means for controlling the flow of fluid pressure from the auxiliary reservoir to the brake actuators including a valve operating element, a fluid pressure actuator responsive to the pressure in the brake actuators for moving said element in one direction, a pressure responsive member for moving said element in the opposite direction and means including an operator controlled mechanism for controlling the flow of fluid pressure from the main reservoir to said pressure responsive member, means independent of said pressure responsive member for moving the valve operating element in said opposite direction, and means responsive to the pressure in the main reservoir for preventing actuation of said valve operating element by said independent means when the pressure in the main reservoir exceeds a predetermined amount.

3. In a fluid pressure brake system having fluid pressure actuators for the brakes, a main reservoir and an auxiliary reservoir, means for conducting fluid pressure from the main reservoir to the auxiliary reservoir, valvular means for controlling the flow of fluid pressure from the auxiliary reservoir to the brake actuators including a valve operating element, means responsive to the pressure in the brake actuators for moving said element in one direction, pressure responsive means for moving said element in the opposite direction, and operator controlled means for controlling the flow of fluid pressure from the main reservoir to said last named means, means independent of said last named means for moving said element in said opposite direction, and means responsive to main reservoir pressure for opposing the action of said independent means.

4. In a fluid pressure brake system having fluid pressure brake actuators, a main reservoir and an auxiliary reservoir for fluid pressure, valvular means for controlling the flow of fluid pressure from the auxiliary reservoir to the brake actuators and for controlling the exhaust of fluid pressure from said actuators to atmosphere including a valve operating element, means responsive to the pressure in said brake actuators for actuating said element in one direction and responsive to pressure supplied from the main reservoir for actuating said element in the opposite direction, means including an operator controlled valve for controlling the pressure of fluid supplied from the main reservoir to said valve element actuating means, resilient means independent of said valve element actuating means for moving said element in said opposite direction, and pressure responsive means subjected at all times to main reservoir pressure for preventing actuation of said valve operating element by said resilient means when said main reservoir pressure exceeds a predetermined value.

5. The combination with a fluid pressure brake system having a main reservoir, an auxiliary reservoir, a fluid pressure brake actuator and a brake valve for controlling the operation of said brake actuator, of valve mechanism for controlling normal and emergency applications of the brake by said actuator including a valve for connecting said auxiliary reservoir with said brake actuator, an element for operating said valve and means responsive to the pressure in said brake actuator for operating said element in one direction and responsive to the pressure supplied from the main reservoir through said brake valve for actuating the element in the other direction, means independent of said pressure responsive means for operating said element in said other direction for establishing a predetermined pressure in said brake actuators, and means responsive to the pressure in said main reservoir for rendering said independent means inoperative when the main reservoir pressure exceeds a predetermined value.

6. The combination with a fluid pressure brake system having a main reservoir, an auxiliary reservoir, a fluid pressure brake actuator and a brake valve having a connection with said main reservoir for controlling the operation of said brake actuator, of auxiliary control mechanism for the brake system including means for conducting fluid pressure from the main reservoir to the auxiliary reservoir and for preventing the flow of fluid from the auxiliary reservoir to the main reservoir, means controlled by the flow of fluid pressure from said brake valve for connecting the auxiliary reservoir with the brake actuator and for connecting the brake actuator with atmosphere, spring means for independently and mechanically operating the means for connecting the auxiliary reservoir with the brake actuator, and means actuated by the pressure in the main reservoir for preventing the operation of said spring means when the pressure in the main reservoir is above a predetermined value.

7. The combination with a fluid pressure brake system having a main reservoir, an auxiliary reservoir, means for conducting fluid pressure from the main reservoir to the auxiliary reservoir, and a fluid pressure brake actuator, of means including a fluid pressure operated relay valve mechanism for controlling the flow of fluid pressure from the auxiliary reservoir to the brake actuator, an operator controlled valve for controlling the flow of fluid pressure from the main reservoir to the relay valve mechanism for controlling the operation thereof, resilient means for actuating said relay valve for supplying fluid pressure from the auxiliary reservoir to the brake actuator independent of the controlling action of said brake valve, means actuated by the pressure in said main reservoir for controlling the operation of said relay valve by said actuating means, and means separate from said actuating means for preventing the flow of fluid pressure from said auxiliary reservoir to said main reservoir.

8. The combination with a fluid pressure brake system having a main reservoir, an auxiliary reservoir and a fluid pressure brake actuator, of valvular mechanism for controlling the flow of fluid pressure to said brakes including a casing having an inlet chamber having a connection with the main reservoir, an inlet valve chamber having a connection with the auxiliary reservoir, valvular means for preventing the flow of fluid pressure from said intake valve chamber to said inlet chamber, an outlet chamber having a connection with the brake actuator, valvular means for controlling the flow of fluid pressure between the inlet valve chamber and said outlet chamber, a movable valve operating element, an abutment on said element, a diaphragm responsive to the pressure in said outlet chamber and in engagement with said abutment for operating said element in one direction, resilient means carried by said diaphragm and engaging said element for preventing leakage from said outlet chamber past the engaging surfaces of said element and diaphragm, a control chamber and a diaphragm responsive to the pressure in said chamber and in engagement with said element for operating the latter in the opposite direction, a self-lapping brake valve having a connection with the main reservoir and with said control chamber for controlling the operation of said second diaphragm, a second valve operating element having a lost motion connection with said first named element, an adjustable spring in engagement with said second element for normally moving the latter and said first named element in said opposite direction for actuating said valvular means and connecting said auxiliary reservoir with said brake actuator, a second control chamber isolated from said first control chamber and having a connection with the main reservoir, and a member in said second control chamber responsive to the pressure therein and carried by said second element for opposing the action of said spring and preventing the operation of said first element thereby when the pressure in the main reservoir exceeds a predetermined value.

9. Valve mechanism for controlling the operation of a fluid pressure brake of the type having a main reservoir, an auxiliary reservoir, a fluid pressure brake actuator and an operator controlled self-lapping valve for controlling the operation of the brake, comprising a casing having an inlet chamber having a connection with the main reservoir, an inlet valve chamber having a connection with the auxiliary reservoir, valvular means for preventing the flow of fluid pressure from the intake valve chamber to the inlet chamber, an outlet chamber having a connection with the fluid pressure actuator, valvular means for controlling the flow of fluid pressure between said intake valve chamber and said outlet chamber, a valve operating element mounted in said casing and having a pair of oppositely disposed abutments, a diaphragm carried by the casing and engaging one of said abutments for operating said element in one direction, means including an annular sealing ring carried by said diaphragm and engaging said element for preventing leakage thereby from said outlet chamber, a second diaphragm carried by the casing and engaging said other abutment for moving said element in a direction opposite to said first named direction, a control chamber formed by said last named diaphragm and casing having a connection with said self-lapping brake valve and adapted under the action of pressure therefrom to move said element and open said intake valve, a second valve operating element having a lost motion connection with the said first named element, a second control chamber formed in said casing adjacent said first named control chamber, a diaphragm carried by said second named element and casing and forming a wall of said second control chamber for operating said second element in one direction, a spring interposed between said casing and said second named element for operating said element in the opposite direction independently of the operation of said element by fluid under pressure from said brake valve, and a connection between said second named control chamber and said main reservoir for supplying fluid pressure to said chamber and diaphragm for preventing the operation of said second named valve element by said spring when the pressure in said main reservoir exceeds a predetermined value.

10. The combination with a fluid pressure brake system having a main reservoir, an auxiliary reservoir and a fluid pressure brake actuator, of fluid pressure actuated means for controlling the flow of fluid pressure from said auxiliary reservoir to said actuator, operator controlled means for conducting fluid pressure from the main reservoir to said first named means for controlling the operation thereof, means independent of the pressure in said auxiliary reservoir for actuating said first named means to establish a connection between said auxiliary reservoir and said brake actuator, means responsive to the pressure in the main reservoir for controlling the operation of said independent means and for permitting operation of the first named means by said independent means when the pressure in the main reservoir falls below a predetermined value, and separate means for preventing the flow of pressure from the auxiliary reservoir to the main reservoir when the pressure in the latter is less than that in the auxiliary reservoir.

11. The combination with a fluid pressure brake system having a main reservoir, an auxiliary reservoir and a fluid pressure brake actuator, of means for conducting fluid pressure from the main reservoir to the auxiliary reservoir and for preventing the flow of fluid pressure in the reverse direction, a fluid pressure operated valve mechanism for controlling the flow of fluid pressure from the auxiliary reservoir to the brake actuator, means including a self-lapping brake valve for controlling the flow of fluid pressure from the main reservoir to the fluid pressure operated valve for controlling the operation of the latter, and means responsive to the pressure in the main reservoir and independent of the pressure in said auxiliary reservoir for controlling the operation of the fluid pressure actuated valve independently of the control thereof by the self-lapping valve.

12. The combination with a fluid pressure brake system having a main reservoir, an auxiliary reservoir, a fluid pressure brake actuator, and a fluid pressure operated relay valve for controlling the flow of fluid pressure from the auxiliary reservoir to the brake actuator, of operator controlled means including a brake valve having a connection with the main reservoir for supplying fluid pressure to the relay valve and controlling the operation thereof, and means for controlling and actuating said relay valve independently of the operation of said operator controlled valve including a pressure responsive member having one side thereof subjected at all times to the pressure in the main reservoir and having a spring acting upon its other side.

13. The combination with a fluid pressure brake system having a main reservoir, an auxiliary reservoir, a fluid pressure brake actuator, and a fluid pressure operated valve for controlling the flow of fluid pressure from the auxiliary reservoir to said brake actuator, of a control valve having a connection with the main reservoir for supplying fluid pressure from the main reservoir to said relay valve for controlling the action thereof and effecting a service brake application, and means acting independently of the pressure in the auxiliary reservoir for automatically effecting an emergency brake application including a pressure responsive member subjected at all times to the pressure in the main reservoir for actuating said fluid pressure operated valve independently of the action of the fluid pressure operated control means.

14. The combination with a fluid pressure brake system including a main reservoir, an auxiliary reservoir, a fluid pressure brake actuator and a fluid pressure operated valve mechanism for controlling the flow of fluid pressure from the auxiliary reservoir to said brake actuator, of mechanism for controlling the operation of said fluid pressure operated valve including an operator controlled valve for controlling the flow of fluid pressure from the main reservoir to said fluid pressure operated valve, and mechanism acting independently of the pressure in the auxiliary reservoir for actuating said fluid pressure operated valve including means controlled at all times by the pressure in the main reservoir for actuating said fluid pressure operated valve to connect the auxiliary reservoir with the fluid pressure brake actuator when the pressure differential between the auxiliary reservoir and the main reservoir exceeds a predetermined value.

15. The combination with a fluid pressure brake system having a main reservoir, an auxiliary reservoir, a fluid pressure brake actuator, and a fluid pressure operated relay valve for connecting the auxiliary reservoir with said fluid pressure actuator, of means including an operator controlled valve having a connection with the main reservoir for controlling the flow of fluid pressure therefrom to said relay valve for controlling the action thereof, and means for actuating said relay valve independently of said controlling valve including a fluid pressure actuator subjected at all times to the pressure in the main reservoir for operating said relay valve to establish a pressure in said fluid pressure actuator proportional to the pressure differential existing between said auxiliary reservoir and said main reservoir.

16. The combination with a fluid pressure brake mechanism having a main reservoir, an auxiliary reservoir, and a fluid pressure brake actuator, of means for conducting fluid pressure between said reservoirs in one direction only, control valve mechanism for said fluid actuator having an intake valve for controlling the flow of fluid pressure from the auxiliary reservoir to the brake actuator and an exhaust valve for controlling the flow of fluid pressure from said actuator to atmosphere, a movable element for sequentially operating said valves, means responsive to the pressure in said fluid actuator for operating said element in one direction to open the exhaust valve and responsive to pressure from the main reservoir for operating said element in the opposite direction to open the intake valve, and means for independently actuating said element including a member having a connection with said element and operable in one direction by means of a spring and in the other direction by the fluid pressure in the main reservoir.

THOMAS J. TUREK.